United States Patent [19]

Hamilton

[11] 4,188,112
[45] Feb. 12, 1980

[54] OUT-OF-FRAME DETECTOR FOR MOTION PICTURE FILM DUPLICATING EQUIPMENT

[76] Inventor: Michael D. Hamilton, 98 Chambers St., New York, N.Y. 10007

[21] Appl. No.: 917,562

[22] Filed: Jun. 21, 1978

[51] Int. Cl.² ............................................. G03B 27/48
[52] U.S. Cl. ................................................. 355/50
[58] Field of Search ..................... 355/18, 50, 64, 55, 355/72, 77, 41, 43

[56] References Cited

U.S. PATENT DOCUMENTS

| | | | |
|---|---|---|---|
| 1,933,787 | 11/1933 | Capstaff | 355/77 X |
| 1,969,465 | 8/1934 | Jones | 355/77 UX |
| 3,040,619 | 6/1962 | Oxberry | 355/55 UX |
| 3,414,353 | 12/1968 | Schwardt | 355/71 |
| 3,768,905 | 10/1973 | Williams | 355/77 |
| 3,881,820 | 5/1975 | Muir | 355/41 |
| 3,902,802 | 9/1975 | Murata et al. | 355/43 |

FOREIGN PATENT DOCUMENTS

N 7066 11/1955 Fed. Rep. of Germany ............ 335/41

*Primary Examiner*—Donald A. Griffin
*Attorney, Agent, or Firm*—Kane, Dalsimer, Kane, Sullivan and Kurucz

[57] ABSTRACT

A system is provided for a step optical printer to detect an out-of-frame condition in the printer projector and/or camera sections. The out-of-frame detector comprises a free wheeling encoder driven by film entering a gate of the printer and a second encoder driven by the printer drive mechanism. A comparator is connected to the outputs of the encoders to detect a lack of correspondence between the length of film entering the gate and the length of film being driven. Such lack of correspondence being indicative of an out-of-frame condition.

11 Claims, 7 Drawing Figures

OUT-OF-FRAME DETECTOR FOR MOTION PICTURE FILM DUPLICATING EQUIPMENT

BACKGROUND OF THE INVENTION

The present invention relates to motion picture film duplicating equipment and, in particular, to a detector for determining if image-bearing film being copied is in-frame with the unexposed film onto which it is being copied.

Motion picture film is commonly duplicated on equipment known as step optical printers. Such printers are available commercially, for example, from the Oxberry Division of Richmark Camera, Inc., Carlstadt, New Jersey and a common model is known as the Oxberry Model 1500. The printer consists of a projector, a camera, and a common drive mechanism for both the projector and camera.

The projector consists of a feed reel, a takeup reel, and a shuttle-gate along with a transport which feeds developed film from the feed reel to the takeup reel through the shuttle-gate. The gate consists of a mechanism which transfers the film on a frame-by-frame basis from the film transport to a projecting position, holds each frame at the projecting position in registration while it is illuminated and photographed and then returns the film to the transport for its eventual travel to the takeup reel.

The camera similarly consists of a feed reel containing a supply of unexposed film, a takeup reel for the film after exposure and a shuttle-gate. The camera also includes an appropriate shutter system and transport mechanism which feeds unexposed film to the camera gate. The unexposed film is then lifted from the transport mechanism, held in position and exposed through the shutter to a projected image which comprises the frame of film in the projector shuttle-gate. The camera gate mechanism then returns the exposed film to the transport mechanism where it is transported to the takeup reel for subsequent development and processing.

Both the projector and camera are driven by a common drive mechanism which operates continuously. The function of the gate is thus to stop each frame of the continuously moving developed and unexposed films to permit the image on the developed film to be exposed to the unexposed film. To make a proper duplicate of the developed film, the unexposed film must be exposed on a frame-by-frame basis properly registered to the developed film.

In actual practice, a very serious problem develops during operation of the printer. For any one of several reasons, film in either the projector or camera can fall out of synchronization with film in the other. This may occur in the projector, for example, as a result of an improper splice, a misaligned sprocket hole, or film that was slightly mutilated during handling. While the problem could also occur in the camera, this is a rather infrequent occurence since the film loaded into the camera is virgin film that is made under strict quality control procedures. However, occasionally, the unexposed film in the camera also sometimes falls out of synchronization because of some malfunction or irregularity. As a result of film falling out of synchronization, the section of film presented in the projector (or camera) gate is not a true frame. It may, for example, comprise the bottom portion of one frame along with the top portion of the next frame. If the equipment were permitted to run in such an out-of-frame condition, the result is that useless information would be exposed on the camera film. The problem is compounded by the fact that the printer operates automatically so that unless an out-of-frame condition is detected and corrected promptly, as much as 2,000 feet of film could be wasted. The problem is compounded even further by the fact that the exposed film could be developed, printed and projected before the problem was discovered.

On 35 mm film, the sprocket hold spacing is such that each frame spans four sprocket holes. thus, if for any reason at all, the gate does not contain a length of film with the four sprocket holes making up a full frame, the information photographed is worthless. On smaller format films, there is a closer relationship between the sprocket holes and frames and a slipped sprocket hole could result in an entire frame being lost on the copy.

In view of the above, it is the principal object of the present invention to provide an out-of-frame detector for use with a step optical printer which readily detects an out-of-frame condition and alerts the operator of the printer of such condition.

A further object is to provide a detector which responds quickly to an out-of-frame situation so as to minimize the amount of film that could be wasted as a result of such condition.

A still further object is to provide such a detector which may readily be incorporated into existing printers at a nominal cost and with relative ease.

SUMMARY OF THE INVENTION

In view of the above, it is the principal object of the present invention to provide a system for use with a step optical printer or the like which readily and accurately detects out-of-frame conditions and triggers an alarm to warn an operator of the existence of such condition. The system is for use with a step optical printer of the type comprising a projector and a camera at least one of which includes a takeup reel, a supply reel and means for transporting film along a path between the supply reel and takeup reel. The step optical printer is continuously driven by appropriate drive means for the film transport. A shuttle-gate is interposed along the film path between the takeup reel and supply reel and is adapted to cyclically remove film on a frame-by-frame basis from the transport means to a stationary position for a fixed time period and then to return the film to the transport means. During the fixed time period, the camera photographs the stopped frame and makes a copy thereof.

In accordance with the present invention, a first encoder is provided along the path of the film between the supply reel and gate. The first encoder is driven by the film and is adapted to generate signals indicative of the length of film driving the encoder between cycles of the gate. A second encoder is provided driven by the optical printer transport drive means and is adapted to generate signals indicative of the length of film driven by the transport means between cycles of the gate. The co-outputs of the first and second encoder are fed to a comparator which generates an alarm signal in the event the first encoder output signal is different from the second encoder output signal indicating that the length of film entering the gate is something other than a frame.

If the step optical printer is operating properly, the first encoder should be driven by the equivalent of one frame of film during each gate cycle.

While the presently disclosed system may be used with either or both of the projector and camera, it is particularly well suited for use with the projector. The principal reason for this is that experience has shown that most out-of-frame conditions occur in the projector rather than the camera. While it is possible that film being fed to the camera shutter may occasionally slip, the sprocket hold may be mutilated, or some other damage to the film may occur, this is a highly unusual condition since the film loaded into the camera must necessarily be virgin film which has only been exposed to very limited handling. On the other hand, the developed film that is projected has very often been edited, spliced, and reused many times so that a good possibility exists that somewhere along the length of film a condition may exist that will throw the printer out of synchronization.

DETAILED DESCRIPTION OF THE PREFERRED EMBODIMENT

Figure 1:
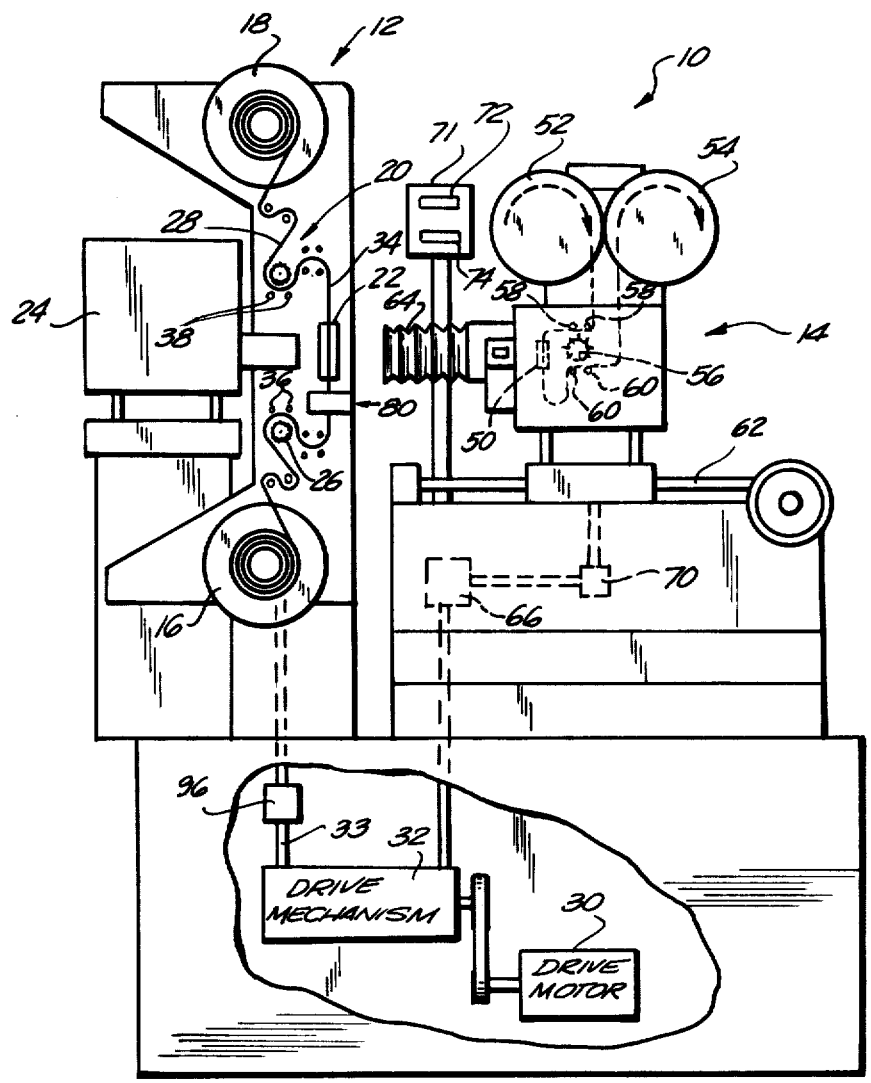
FIG. 1 is a simplified diagrammatic view of the out-of-frame detector of the present invention incorporated in a step optical printer.

Reference is now made to the drawing and to FIG. 1 in particular wherein a step optical printer 10 is depicted in a simplified diagrammatic form. As stated, such printers are available commercially from the Oxberry Company. The printer consists of a projector 12 and camera 14. The projector consists of a supply reel 16 containing a reel of developed film to be reproduced and a takeup reel 18. The film is fed through a transport mechanism generally designated by the number 20 through an Oxberry shuttle-gate 22. The gate serves to stop the film on a frame-by-frame basis, without disrupting the continuous drive of the supply reel and project each frame onto the image plane of camera 14. To this end, a light source 24 suitably illuminates each frame of film to properly expose the film in camera 14.

The transport for projector 12 consists of a supply reel sprocket 26 and takeup reel sprocket 28, which along with the takeup reel 18 and supply reel 16, are driven by drive motor 30 through a drive mechanism 32 and drive train 33. The film 34 is held against sprockets 26 and 28 by appropriate rollers 36 and 38 which insure that the sprocket holes on the film are engaged by the sprocket teeth.

Shuttle-gate 22 consists of an intricate mechanism, the important components of which, for purposes of the present invention, are a fixed registration pin or pins 40 and moving fork 42. The fork contains at one end one or more pins 44. As each frame enters the gate, it is transferred from the pin 44 of fork 42 to the fixed pin 40. This action "freezes" the frame in registration in the gate during which an unexposed frame of film in the camera is exposed to the image on the frame within the gate. Light 24 provides the proper illumination for exposure. The film is then transferred to pin 44 of fork 42 and shifted out of the gate, whereafter the next frame is transferred to the fixed pin and the cycle repeats. The moving pin 44, must necessarily move the film through the gate faster than the remainder of the film is threading its way through the projector to make up for the lost motion that occurs when the frame is photographed. During operation of the gate, the drive for the projector is continuous and thus, the film loops generally designated at 46 and 48 will vary in length during the process. Thus, when a frame is stopped within gate 22, loop 46 extends to the position shown in phantom in 46a as a result of sprocket 26 continuing to supply film toward the gate. Similarly, loop 48 shrinks to the position shown in phantom as 48a as a result of reel 28 continuing to remove film from the gate. Similarly, as the frame is rapidly moved through gate 22, loop 46 shrinks to the position shown in phantom as 46b as a result of more film being moved through the gate that is being provided through sprocket 26. Similarly, loop 48 expands to position 48b as a result of sprocket 28 taking up less of the film that is provided by gate 22.

A gate 50 similar to gate 22 is provided in camera 14. While the operation of the camera will be discussed in some detail below, suffice it to say for the present, that for each frame of developed film stopped by gate 22, a corresponding frame of unexposed film is stopped by camera gate 50. The equipment is synchronized so that the frames in gates 22 and 50 are held for a sufficient time while a shutter (not shown) in camera 14 is open to permit the image of the projector film to expose the camera film.

Camera 14 consists of a supply reel of unexposed film 52 along with a takeup reel 54 for the film after exposure. The film is fed by a drive sprocket 56 through appropriate guide rollers 58 and 60 through gate 50 to reel 54. The camera is mounted on a rail 62 and contains a lens and bellows 64 so that the image of a frame in projector 22 will properly expose each frame of film as it passes through gate 50. The camera film transport is driven by drive 30 and clutch mechanism 32 through an appropriate drive train 66 and 70. Since both the camera and projector are commonly driven, there should be a one-to-one correspondence between a frame of developed film 34 and projector gate 22 and unexposed film 68 in camera gate 50. The rail 62 permits the camera to be zoomed back and forth to accommodate different film sizes. That is, the projector may, for example, project a 35 mm image on film 34 to be copied onto 16 mm film 68. This requires that the image size viewed by the camera be reduced with respect to that of the projector to account for the size variations in the film sizes. The sprockets must also be changed as required to accommodate different film sizes and variations in speed.

A counter 71 contains a pair of displays 72 and 74 which respectively readout the frame number for the developed and unexposed film. These numbers would be identical where there is a 1:1 correspondence between the original and duplicate film or the numbers would be dissimilar if some editing of the film to be copied is being performed.

The above generally describes the operation of the previously mentioned commercially available step optical printer. Heretofore, if for any reason, the camera and projector were to become slightly out-of-frame, even by a small amount, the resultant copied film would be worthless. In addition, in most cases, it would not have been possible for an operator to detect the out-of-frame condition until the exposed film stored on reel 54 was processed, developed and then projected and viewed.

Figure 4A:
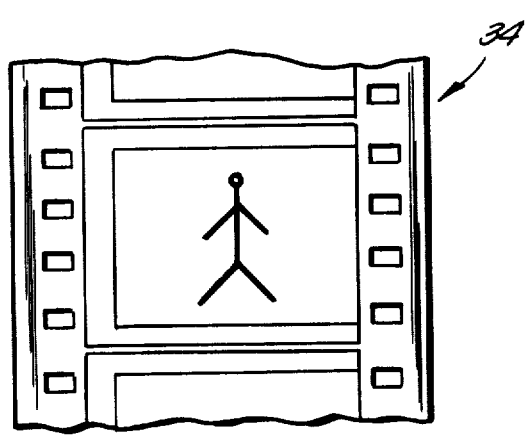
FIGS. 4A and 4B are diagrammatic views depicting the projector film and camera film, respectively, when the step optical printer is in-frame; and, FIGS. 5A and 5B are views similar to FIGS. 4A and 4B depeicting the projector film and camera film, respectively, when an out-of-frame condition exists.
Figure 4B:
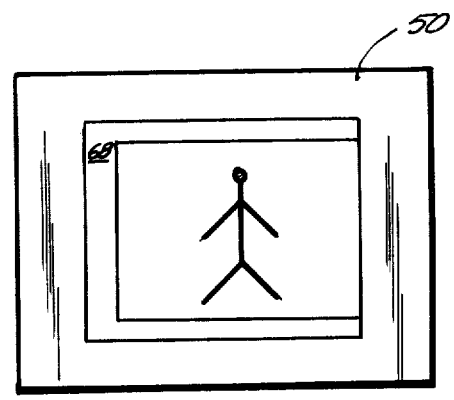
Figure 5A:
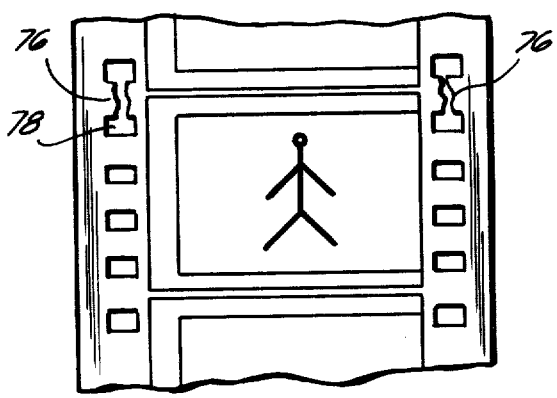
Figure 5B:
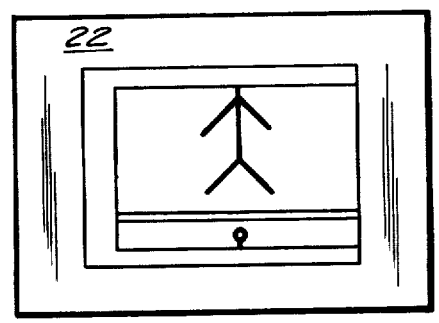

The out-of-frame problem may best be understood with reference to FIGS. 4 and 5. FIG. 4A shows a frame of developed film 34 stopped in gate 22 for projection onto a frame of unexposed film 68 stopped in gate 50. If later on in the sequence, film 34 should slip, for example, as a result of a tear 76 between adjacent sprocket holes as shown in FIG. 5A, the portion of film in gate 22 would not be a true frame but rather overlapping portions of two adjacent frames as shown in FIG. 5B. This would result in the film 68 being exposed to something other than a full frame. Upon development of film 68, the resultant film would be useless. Each frame on film 34 bears a relationship to the sprocket holes 78 of the film. For example, for 35 mm film, each frame spans four sprocket holes. Thus, an out-of-frame condition is caused by something other than the length of film between four sprocket holes passing through the gate through a gate cycle. Stated another way, as long as for each gate cycle the length of 35 mm film equivalent to four sprocket holes passes through the gates, printer 10 must remain "in-frame". An out-of-frame condition develops if either the projector gate or camera gate advances something more or less than a frame of film.

The following discussion of the present invention is directed at an out-of-frame detector system associated with projector 12. It should be appreciated at the outset that the system would apply equally to camera 14 and such systems may be supplied to the projector 12, camera 14, or both the projector and camera. In addition, where printers have multiple cameras or projectors, an out-of-frame detector may be provided for each camera and/or projector.

Figure 3:
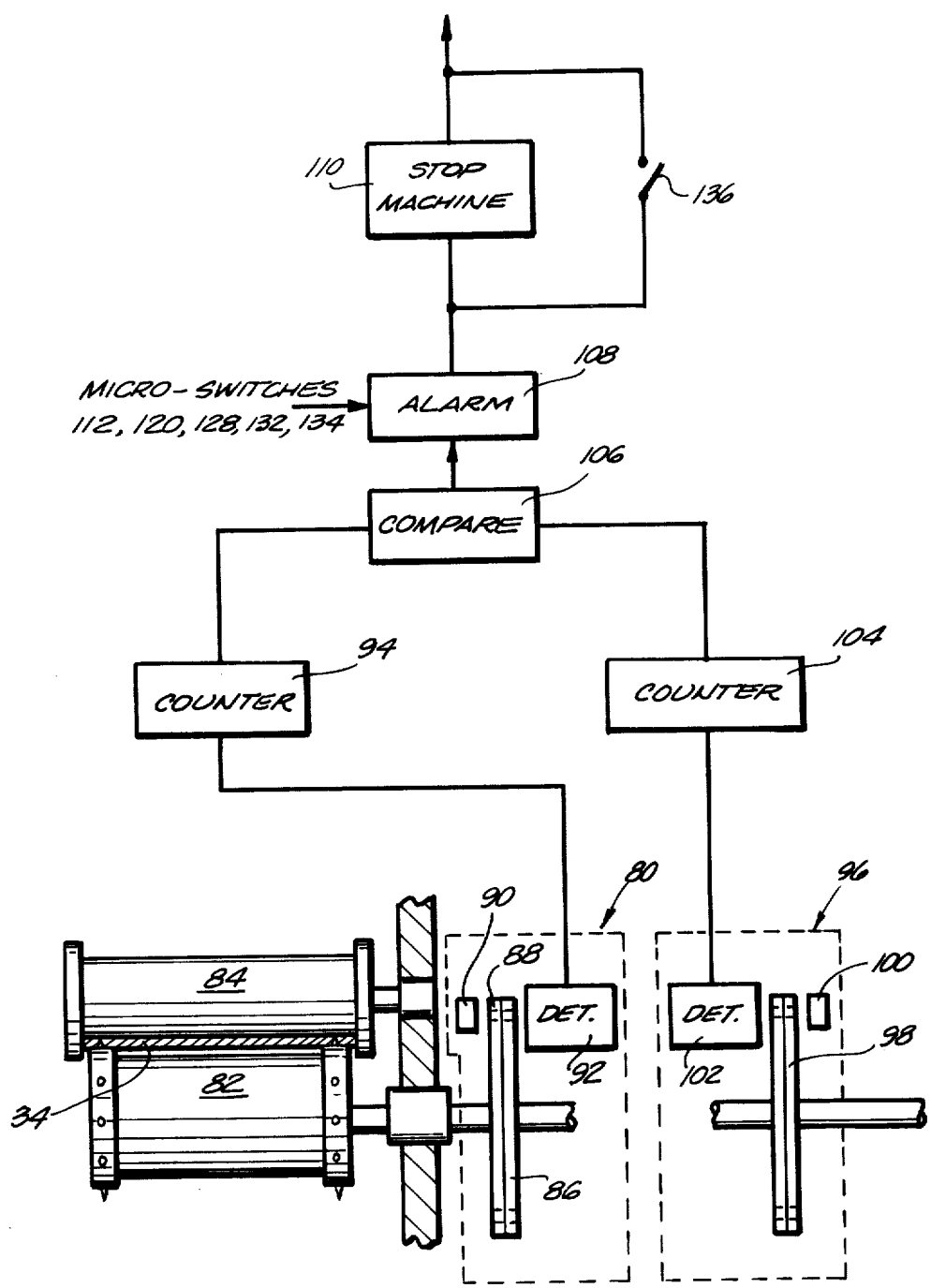
FIG. 3 is a simplified diagrammatic partial block diagram of the out-of-frame detector system of the present invention.

In accordance with the present invention an encoder 80 is mounted in the film path between supply reel 26 and gate 22. Encoder 80 consists of a free turning sprocket wheel 82 which is driven by film 34. That is, as film is advanced through gate 22, its sprocket holes engage the teeth of sprocket wheel 82 and causes the wheel to turn. A guide roller 84 ensures that the sprocket holes of film 32 engage the teeth of wheel 82 causing the wheel to rotate. Referring to FIG. 3, it can be seen that as sprocket 82 rotates, a coaxial encoder disc 86 is also rotated. Disc 86 may, for example, contain a series of equispaced openings 88 about its periphery. Disc 86 is positioned between a light source 90 and detector 92. As the disc rotates, the light reaching source 92 is interrupted between openings 88 resulting in a series of pulses which are counted by counter 94. Since disc 86 rotates with wheel 82, a fixed relationship exists between the number of pulses that should be generated by the detector as a given length of film rotates the sprocket wheel. The resolution of the detector is determined by the number of openings 88 for the length of film, the more openings 88 the greater the resolution. A similar encoder 96 is mounted to the film drive mechanism 32. Encoder 96 accurately measures the position of drive train 33 in a manner similar to the operation of encoder 86, that is, by containing thereon a wheel 98 with openings that interrupt the path from light source 100 to detector 102. Since encoder 96 measures the position of drive train 33, and drive train 33 drives the film transport mechanism for the projector, a fixed relationship exists between the amount of film being driven toward gate 22 and the output of counter 104 which counts the light pulses reaching detector 102.

When printer 10 is operating in-frame, the output of counter 94 equals the output of counter 104. This means that the amount of film being driven toward gate 22 (as measured by encoder 96) is equal to the amount of film actually entering the gate (as measured by encoder 80). The outputs 94 and 104 are fed to a comparator 106 and if a deviation beyond accepted norms exists, an error signal is generated to trigger alarm 108 which, in turn, may sound an audible or visible alarm or generate a signal 110 to stop the printer equipment.

Figure 2:
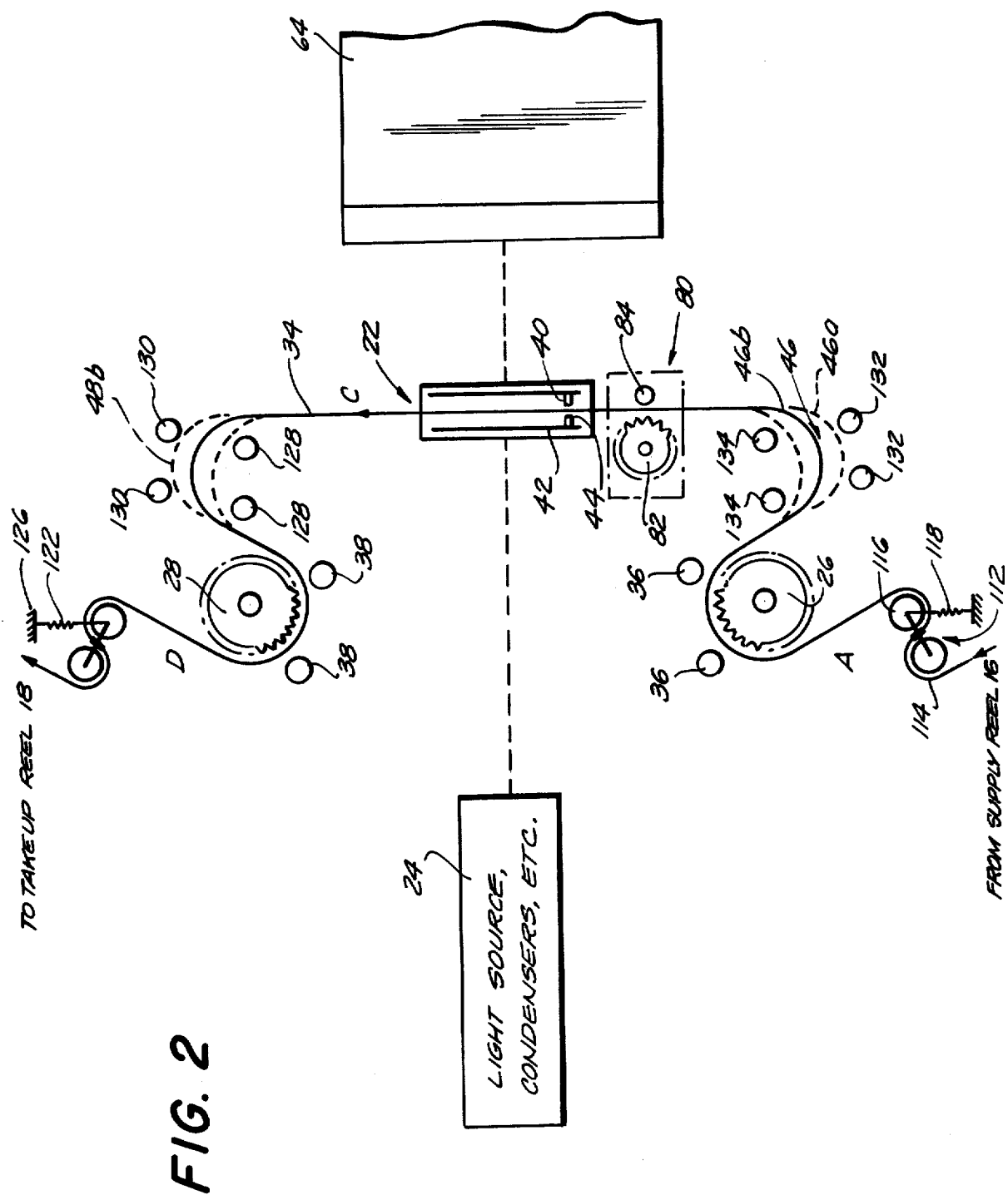
FIG. 2 is an enlarged diagrammatic view of details of the film transport for the projector portion of the step optical printer.

As was stated, it is important to detect an out-of-frame condition as early as possible so as to eliminate or at least minimize the amount of film that could be wasted by an out-of frame condition. In addition to the conditions discussed above that could result in an out-of-frame condition (i.e., torn sprocket holes, etc.) there are certain conditions, such as a complete break in the film, which must necessarily result in an out-of-frame condition eventually. It is thus important to detect a breakage in the film and detectors for this purpose are provided. Film breakage can result in one of four places in the film path. These places are generally designated in FIG. 2 by the letters A, B, C and D respectively as follows: between supply reel 16 and supply sprocket 26 ( . . . Zone A), between sprocket 26 and gate 22 ( . . . Zone B), between gate 22 and takeup sprocket 28 ( . . . Zone C), and between takeup sprocket 28 and takeup reel 18 ( . . . Zone D).

To detect a film break in film path Zone A, a tension wheel arrangement 112 is provided. Mechanism 112 consists of a pair of rollers 114 and 116 one of which (114) is fixed and the other is secured to the projector frame through spring 118. When film 34 is under tension between supply reel 16 and sprocket 26 wheel 116 is pulled away from frame 112. If the tension on film 34 should slacken (i.e., if the film breaks) in Zone A, spring 118 will pull roller 116 to frame member 112 thereby triggering a micro switch (not shown) indicating a broken film condition.

Similarly, an identical arrangement 120 can detect a broken film condition in Zone D. In this case, if film 34 should become slack within Zone D, spring 122 will urge wheel 124 toward frame member 126 thereby triggering a micro switch (not shown).

If a break were to occur in Zone C of the path of film 34, loop 48 would collapse and the series of micro switches 128 are positioned below the lowermost permissible limit of path 48a of loop 48 to detect such a collapse. Similarly, in the event of a malfunction in sprocket 28, loop 48 would build up beyond the upper acceptable limit 48b to thereby trigger micro switches 130. Similarly, if a break should occur in Zone B of the film path, loop 46 would collapse thereby causing the film to engage micro switches 132 positioned below the lower acceptable bounds 46a of loop 46. If sprocket 26 should fail, loop 46 would tighten beyond the acceptable upper allowable limit 46b thereby causing the film to engage micro switches 134. In the event the film is stuck in gate 22, loop 46 will tend to elongate and loop 48 will tend to shorten, thereby causing micro switches 132 and 128 to eventually be excited.

In some cases, the natural curl of the film could result in the loop reversing under the above conditions. By placing microswitches on both sides of the loop, any variation beyond the permissible limits would be detected.

In the event a malfunction in the film is detected in any of Zones A, B, C or D, the associated micro switches are connected to the machine drive and/or to an alarm to alert an operator.

In the production of motion picture films, an out-of-frame condition is sometimes desired. This occurs, for example, in special editing conditions and other special effects. Also, it may be desirable to project a length of film too short to thread, as for example where titles or credits are to be superimposed onto the printed film. For these special effects, a bypass switch 136 is shunted across the signal generator 110. If an operator knows that a special condition is being created that could, to the present system, appear as an out-of-frame condition, the bypass switch 136 may be closed to prevent the printer from shutting itself down.

It must be reiterated once again that while the present invention was disclosed with the detector system associated with projector 12, it could just as easily have been provided in conjunction with camera 14 or systems for both the projector and camera could have been provided. In addition, it should be appreciated that while encoders 80 and 96 are discussed as being optical devices, they could just as easily have been comparable devices such as magnet encoders, etc.

The above description was made with the printer operating in the "forward" direction. It should be appreciated that the printer could also be operated in the reverse direction in which case the supply and takeup positions for the projector as well as the camera sections would be reversed.

Having thus described the invention, what is claimed is:

1. In a printer of the type comprising: a takeup reel, a supply reel, means for transporting film along a path between said supply reel and said takeup reel, means for continuously driving said transport means, and a gate wherein film is positioned for exposure during cycles of said gate the improvement comprising: first encoder means driven by said film positioned along the path of said film between the supply reel and gate, said first encoder being adapted to generate signals indicative of the length of film driving the encoder between cycles of said gate; second encoder means driven by said transport means, said second encoder being adapted to generate signals indicative of the length of film driven by said transport between cycles of said gate; and comparator means connected to said first and second encoder means and adapted to generate a signal in the event said first encoder signal and second encoder signal do not match.

2. The invention in accordance with claim 1 wherein said printer is an optical printer having a shuttle-gate.

3. The invention in accordance with claim 1 wherein said first encoder includes a free wheeling sprocket.

4. The invention in accordance with claim 1 further comprising a feedback loop between said comparator and said drive means.

5. The invention in accordance with claim 1 further comprising a supply sprocket in said film path between said supply reel and said gate, a loop in said film path between said supply sprocket and said gate, and feeler switches positioned adjacent said loop to detect if said film slackens or tightens said loop beyond preset limits.

6. The invention in accordance with claim 1 further comprising a takeup sprocket in said film path between said supply reel and said gate, a loop in said film path between said takeup sprocket and gate, and feeler switches positioned adjacent said loop to detect if said film slackens or tightens said loop beyond preset limits.

7. The invention in accordance with claim 1 further comprising a supply sprocket in said film path between said supply reel and said gate and film tension sensing means positioned in said film path between said supply reel and said supply sprocket.

8. The invention in accordance with claim 1 further comprising a takeup sprocket in said film path between said takeup reel and said gate and film tension sensing means positioned in said film path between said takeup reel and said takeup sprocket.

9. The invention in accordance with claim 1 wherein said projector includes said takeup reel, supply reel, transport means, gate and first encoder.

10. The invention in accordance with claim 1 wherein said camera includes said takeup reel, supply reel, transport means, gate and first encoder.

11. The invention in accordance with claim 1 wherein each of said projector and camera include a takeup reel, supply reel, transport means, gate and first encoder.

* * * * *